Oct. 20, 1953        W. H. COULTER        2,656,508
MEANS FOR COUNTING PARTICLES SUSPENDED IN A FLUID
Filed Aug. 27, 1949        2 Sheets-Sheet 1
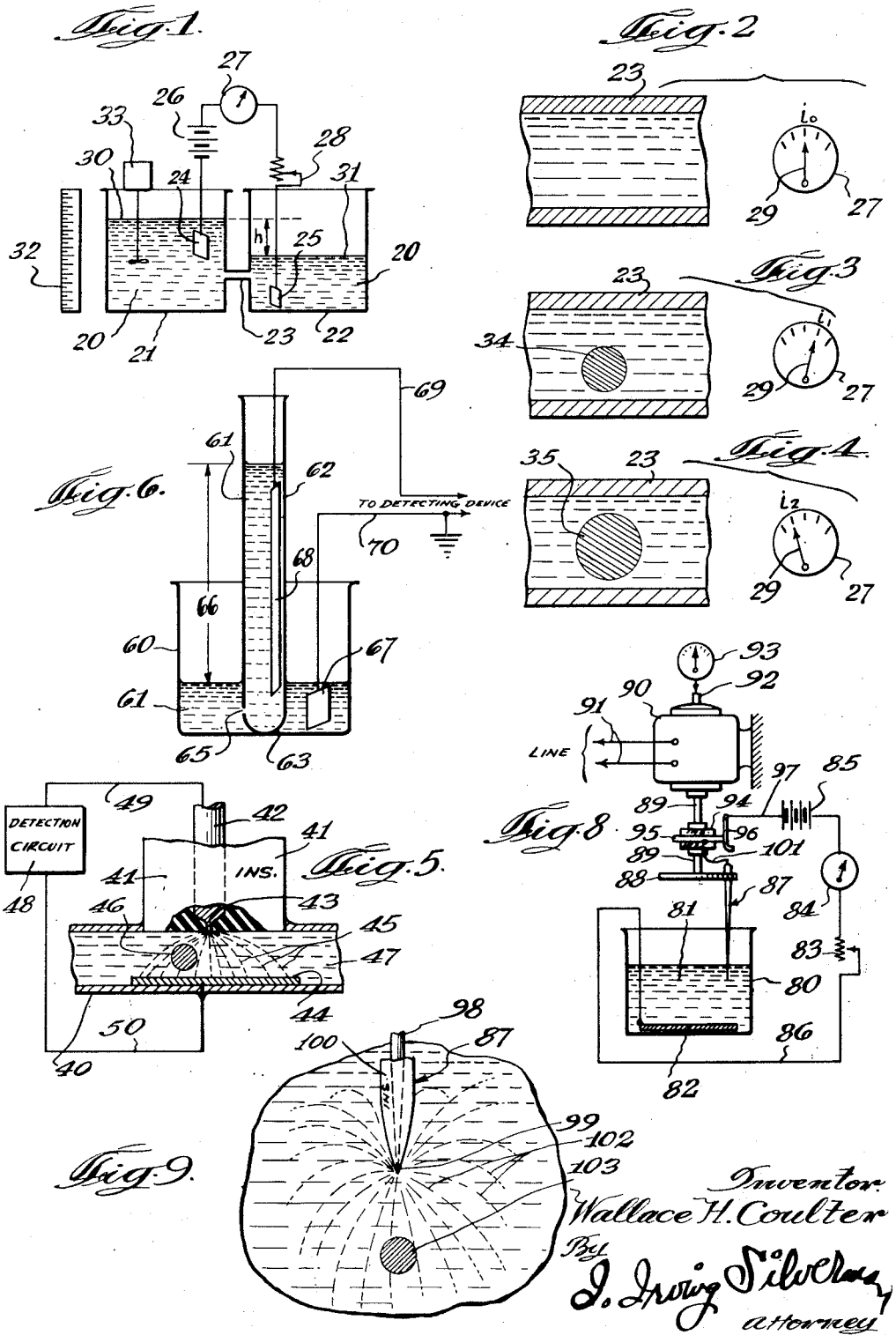
Inventor
Wallace H. Coulter
By J. Irving Silver
Attorney Oct. 20, 1953     W. H. COULTER     2,656,508
MEANS FOR COUNTING PARTICLES SUSPENDED IN A FLUID
Filed Aug. 27, 1949     2 Sheets-Sheet 2
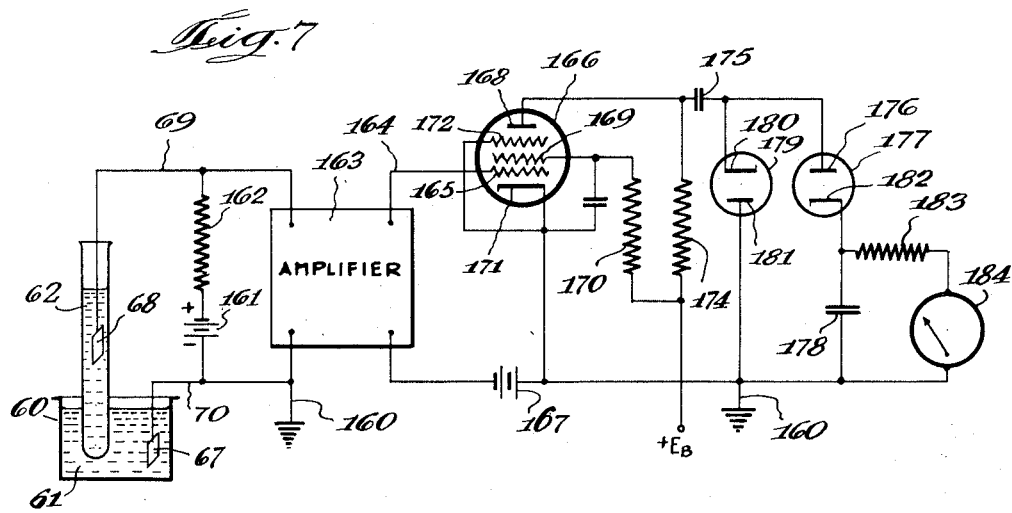
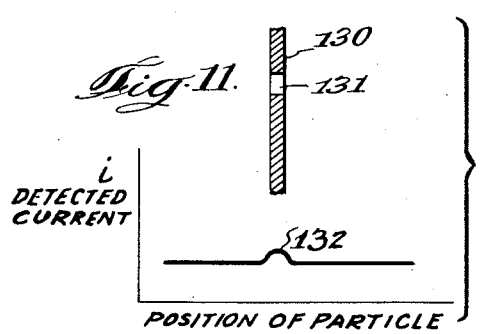
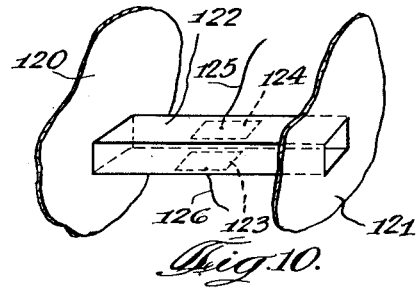
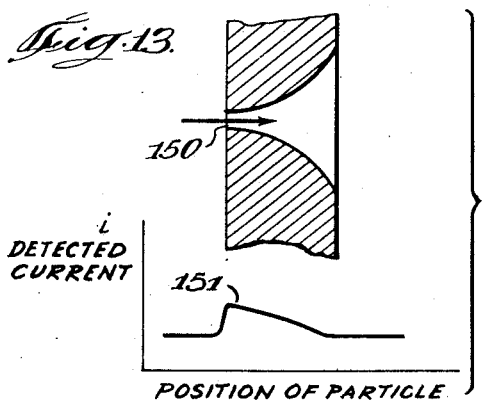
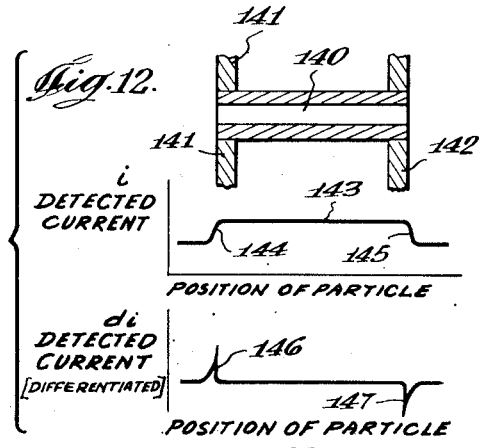

Patented Oct. 20, 1953

2,656,508

UNITED STATES PATENT OFFICE 2,656,508

MEANS FOR COUNTING PARTICLES SUSPENDED IN A FLUID

Wallace H. Coulter, Chicago, Ill.

Application August 27, 1949, Serial No. 112,819

17 Claims. (Cl. 324—71)

This invention relates to means for detecting and counting particles suspended in a fluid medium.

In the counting of particles of the type contemplated by my invention, heretofore it has been difficult to obtain accurate results because of the limitations inherent in methods used and in the associated apparatus required. Some previous methods have been based upon colorimetry, that is the utilization of color density of a given sample to obtain a measure of the number of particles suspended, when compared with other known standards. In certain other methods, the sample is placed in a counting chamber and the particles are actually counted under a microscope, or the sample may be placed between microscope slides for counting.

Information of the type obtainable by determining particle concentration is especially valuable to the medical profession. Blood cell counts as well as the counts of other particles in the body fluids serve for many diagnostic purposes, and as well to evidence physical and pathological conditions of different parts and organs of the body. Obviously such information, in order to be of great value, must be obtained quickly and must also be accurate. The previous methods alluded to were not only subject to great inaccuracies and required considerable time to be accomplished properly, but as well required the services of highly skilled technicians and hence were not readily available to all who required the same.

In addition to the great inaccuracy of prior methods, for the most part said methods required expensive and complicated apparatus. All of the above enumerated difficulties and disadvantages have been eliminated and overcome by my invention. Accordingly, the principal objects of my invention are: to provide novel means for detecting and counting particles suspended in a fluid; to provide such means whereby a greater accuracy than heretofore possible can be attained; to provide such means which will enable counting to be done quickly and by unskilled personnel; to provide such means whereby counting can be done economically and with easily obtained and simple apparatus.

A further object of my invention is to provide new means for detecting and counting particles whereby a sample of the concentration to be measured is caused to pass through a constricted path and the presence or absence of a particle in the constriction gives rise to a detectable change in the electrical characteristics of the path.

An ancillary object of the invention is to provide means for detecting and counting particles whereby a constricted current path is established through a sample of the concentration to be measured and the presence or absence of a particle in the constricted current path will produce detectable changes in the circuit carrying the current.

Other objects will become apparent as I proceed with further explanation of my invention.

My invention has a certain limitation which, although minor, is desired to be pointed out at this time in order to present a complete and thorough explanation of my invention. The particles which can be detected and counted by my new means must be capable of being suspended in a fluid medium without appreciable loss of particles by settlement. For purposes of obtaining uniformity throughout the solution, mechanical and continuous agitation may be used if required during the time that the detection and counting are taking place.

A requirement of my invention is that there must be a difference between the electrical conductivity of the fluid and that of the particles. It is almost impossible to have a fluid medium with particles suspended therein of the same conductivity as the fluid. When this does occur it is generally possible to alter the conductivity of the fluid in which the particles are suspended in any well known manner, such as for example adding electrolytes to increase conductivity or diluting with non-conductive fluid such as distilled water to decrease conductivity.

Basically, my invention consists in diluting a suspension to a point where the particles suspended in the fluid medium are relatively scattered throughout the medium so that in detection and measurement there will be a minimum of masking caused by the presence of more than one particle in the sensitive or detecting area. Following this the fluid is caused to flow past a point of constricted current passage. This can be done in a number of ways. The fluid may be flowed through a constriction through which a current is passing; it may be flowed past an extremely small electrode through which current is flowing; or an insulated electrode having an extremely small exposed tip surface may be moved through a sample of the fluid at a given rate.

Putting the basic concept of my invention in other language, my invention consists of reducing the dimensions of or constricting an electric current path in a fluid so that the presence or controlled movement of the article bearing fluid in, through, or past such path will, by reason of the difference in conductivity between the fluid and the particles, cause the individual particles to modulate the current in a detectable manner.

The apparatus of my invention consists of various means, depending upon the manner in which the constricted current path is obtained. Such means will be described in detail hereinafter, and will be illustrated in connection with the explanation together with certain diagrams to explain the operation thereof. The purpose will be to explain the preferred manners of carrying out my invention and the preferred apparatus for use therewith, but no limitations are intended except as set forth in the appended claims.

Referring now to the drawings, in which:

Fig. 1 is a more or less diagrammatic view of one form of my invention showing an expedient for obtaining a constricted current path by providing a narrow conduit through which the particle bearing fluid is adapted to pass.

Figs. 2, 3, and 4 are schematic sectional views taken through the constriction of the apparatus shown in Fig. 1 and illustrating various conditions thereof.

Fig. 5 is a schematic sectional view taken through the constriction of another form of the invention.

Fig. 6 is a sectional view taken through a practical form of apparatus using the principles illustrated in Figs. 1 to 4.

Fig. 7 is a diagrammatic view showing a circuit used to measure rate of particle flow in connection with the apparatus of Fig. 6.

Fig. 8 is a more or less diagrammatic view of a form of my invention showing an expedient for obtaining a constricted current path by utilizing a fine electrode moving in a given path through a particle bearing fluid.

Fig. 9 is a fragmentary view illustrating the construction of a suitable electrode and showing how the passing of a particle influences the flow of current therethrough.

Figs. 10, 11, 12, and 13 are diagrammatic views of different types of fluid conduits, illustrating as well the effects of particles passing therethrough.

As stated above, I have chosen to describe my invention by illustrating and alluding to three different types of apparatus used to practice the same. All three of these devices, as well as many others which may be used to apply the method, have in common the characteristic that there is formed a current path which is modulated by the pasage of particles through or near the path so that the current flow is changed due to the difference between the conductivity of the particle and the conductivity of the particle bearing medium in which equilibrium of the measuring instrument (signifying absence of particles) has been established.

In Fig. 1 there is illustrated an apparatus in which the fluid carrying the particles is caused to flow at a given head for a given length of time from one vessel to another. There is an electrode in each vessel and current is passed through the constriction. The presence of a particle in the constriction will cause the current flow to change.

In Fig. 5 there is illustrated an apparatus in which there is a constricted conduit through which fluid flows. In this case, the electrodes are both placed in the construction instead of in the vessels connected thereby.

In Fig. 8 there is illustrated an apparatus in which a fine electrode is moved through a vessel containing a given dilution at a given rate so that it will influence a given volume of particles in a given time. The proximity of the electrode to a particle will cause changes in the current flow if within the electrical influence of the electrode.

In practicing my invention, and using the apparatus illustrated herein, although accurate results can be obtained by persons of less skill than heretofore required, certain techniques must still be carried out with care. The handling of the fluids is included in these techniques. Presuming that a determination of the number of certain particles in a given fluid is intended to be obtained, first a sample of the particles to be studied is carefully diluted in the fluid medium being used so that there exists a known relationship between the diluted sample and the original concentrated sample. By experiment, a dilution is chosen which will scatter the particles through the fluid medium within practical limits. The purpose of this is to eliminate the major masking which would occur if the particles were so recurrent that groups or clumps would be more likely to influence the measuring current path than single passing particles.

The fluid medium and the particles must have different conductivities in order for my invention to produce a satisfactory study. Obviously, if the conductivity of both the particles and the medium were the same there would be no current changes and the indication would be a constant current flow as would occur if the electrodes were placed in a homogeneous solution without particles. The difference in conductivity need not be great since it is a relatively simple matter to detect minute changes in electric current with modern measuring devices well known in the art. As set forth above, the conductivity of the fluid is readily varied for the purposes of the process.

The fluid sample of known dilution is now placed in any apparatus suitable for carrying out the necessary measurements. For example, suppose that the apparatus of Fig. 1 is utilized. The suspension sample is indicated generally at 20 and the apparatus includes two vessels 21 and 22 of insulating material which are are interconnected by means of a fine insulated constriction 23. In order to show the apparatus clearly the constriction 23 is shown as being relatively long and of considerable inside diameter. Actually the bore of the constriction 23 is extremely fine so that the influence of a single particle may be detected. For example, in the case of apparatus for counting the number of red corpuscles in a solution, the bore of the constriction 23 will be of the order of a thousandth of an inch or less in diameter. Likewise, the conduit should be as short as possible. This is to decrease the effect of masking which would be caused if more than one particle were in the passageway of the conduit 23 at one time.

An electrode 24 is placed in the vessel 21 and a second electrode 25 is placed in the vessel 22, the electrodes being connected by means of a detecting circuit which consists in this instance of a battery 26, current meter 27, and a variable resistor 28. When current is permitted to flow in the circuit, it will flow through the fluid of the constriction. The vessels 21 and 22 and the constriction 23 are fabricated from some insulating material such as for example glass. Under a given set of conditions a current $i_0$ will flow through the circuit and be indicated by the meter 27, as shown diagrammatically in Fig. 2. This value of current can be, for example, the current flowing when no particles are in the constriction 23 and the value of $i_0$ has been represented by the needle 29 pointing vertically. The continuation of flow from one vessel to another will cause no change in current $i_0$ so long as no particle enters the constriction 23.

In order to induce flow, the level 30 of vessel 21 is set higher than the level 31 of the vessel 21 so that there will be a pressure differential or head tending to cause the suspension to flow from one vessel to the other by way of the constriction 23. I have shown a graduated scale 32 alongside the vessel 20 to indicate that measurement of the change in volume is to be made during the time of fluid flow so that the exact amount of fluid moving through the constriction 23 accurately can be determined. In actual practice if this type of apparatus is used, the bore of the constriction is so minute that the actual volume of fluid moving from one vessel to another is negligible so far as decreasing the head is concerned. The level 30 will hardly vary during the time that measurement is made so that the head can be considered constant without introducing any error greater than caused by other factors.

I have diagrammatically illustrated an agitator 33 whose purpose it is to render the suspension as homogeneous as possible during the time that measurements are taken. Likewise, as a precaution against settlement giving false readings, which might be caused because of difference in density between the particles and the fluid, the constriction 23 is formed a substantial height above the bottom of the vessel 21.

Referring now to Fig. 2, while there is no particle in the constriction 23, the flow of current will be $i_0$, a constant value, and the resistance to flow through the fluid is determined by the conductivity of the fluid. Presuming now, that a particle 34 has entered the constriction from the vessel 21 and is passing through the constriction into the vessel 22. This is shown in Fig. 3. For a short distance, the cross sectional area of the fluid in the constriction 23 is reduced materially, and instead of the fluid medium displaced by the particle 34, the particle itself affects the flow of electrical current. The particle 34 has a conductivity which is different from that of the fluid 20 so that there will be a change in the current flow, and the value of current flow will no longer be $i_0$. If the conductivity of the particle 34 is greater than that of the fluid there will obviously be a decrease in resistance and an increase in the current measured by the meter 27. The new value will cause a deflection of the meter needle 29 to the new value $i_1$ but the instant that the particle has passed through the constriction 23, the needle 29 will return to the position shown in Fig. 2 because there no longer is a foreign body in the constriction, and the flow of current will once more be $i_0$.

It will be seen that by counting the number of times that the needle 29 deflects from $i_0$ to $i_1$ for a given time representing the flow of a given volume of fluid from vessel to vessel one can calculate the number of particles per unit of the suspension and thus determine the number of particles per given volume unit of the original sample.

If, instead of or in addition to the particles 34 having a greater conductivity than the fluid medium 20, the suspension contained other particles, such as for example particles having a conductivity less than that of the medium, when the particle designated 35 in Fig. 4 entered the constriction 23, the resistance to flow of current would increase, thereby decreasing the flow of current from the quiescent value $i_0$ to a value $i_2$ and the needle 29 would deflect in such case to the left as shown in Fig. 4.

From the above description and discussion it will be seen that a detecting circuit can be used to count mixtures of particles as well as suspensions having one type of particle therein. Such detecting circuits may have discriminating means, electronic counters, and many other kinds of counting apparatus familiar to those skilled in the art. The counters may be arranged to be energized by different values of current so that separate counters could be used to register the number of different types of particles of the suspension. Likewise, rate determining devices can be used to count the rate at which a number of particles is passing through the constriction for example. By these and other apparatuses used in connection with my invention, one can determine the size of unknown particles (by comparing the current change caused thereby with that caused by a particle of known size, for example), the number present, and much additional information.

The apparatus described above is only intended to illustrate the manner in which the invention can be carried out and in many cases would be considered impractical for laboratory use. The principles, however, are capable of application to many types of apparatus which should occur to those skilled in the art.

For greatest sensitivity of the apparatus, it is desirable to have the dimensions of the electrical path, for example, the cross sectional area of the fluid in the bore 23, of the same order as those of the particle. In certain instances it may be possible for the particle to be considerably larger than the path of the current flow. Thus, an electrode tip may be immersed in a constricted fluid path and have the diameter of the tip less than the diameter of the particle. I have illustrated such conditions in Fig. 5. In the case of a constriction, obviously the bore must be larger than the particles; and in many cases, large enough to prevent debris from clogging the bore.

In Fig. 5, there is provided a constriction 40 of some insulating material such as for example glass, having particles suspended in a fluid medium 47 flowing therethrough under a given head. I have shown an insulating block 41 secured in the constriction in fluid-tight connection. In the center of the block 41 I have provided an electrode 42, but the end of the electrode which is exposed to the solution is extremely fine as shown at 43. There is provided a plate 44 in the constriction forming the second electrode for the electrical circuit so that current flows through the fluid medium from the tip 43 to the plate 44. Since the current must all flow through the extremely small tip 43, the current flow through the medium 47 can be represented as shown by the broken lines 45. In the vicinity of the tip 43 the current density will be extremely high, so that the presence of a particle such as shown at 46 will be readily detected by the detecting circuit 48 which as shown is connected to electrode 42 by lead 49 and to plate 44 by lead 50. The smaller the tip 43, and the closer the particle 46 thereto, the greater will be the sensitivity of the apparatus. The proportions of Fig. 5 are greatly exaggerated in order clearly to illustrate the apparatus thereof.

In Fig. 6, I have shown a practical example of the apparatus of Fig. 1 with which I have had good success. There is provided a glass vessel 60 having a suspension 61 therein. A relatively long glass tube 62 is arranged in the vessel 60 and the tube is also provided with a quantity of the suspension 61. The tube is fixed relative to the vessel 60, such as for example by having its bottom resting upon the bottom of the vessel as shown at 63. The tube 62 and vessel 60 are of insulating material such as for example glass. Near the bottom of the tube 62 and in its side wall there is provided a pin point aperture 65 said aperture being spaced above the bottom of the said tube. The fluid 61 is adapted to flow from the tube 62 through the aperture 65 and into the vessel 60 by virtue of the head 66 existing between the two containers. In the vessel 60 I have inserted an electrode 67 immersed in the fluid 61 and in the tube 62 there is another electrode 68. Current is arranged to flow between the electrodes through the aperture 65 so that the presence of a particle in the aperture will cause a change in the current flow. The electrodes 67 and 68 are connected to a detecting device not shown here by the leads 69 and 70.

As explained above, the invention is capable of being carried out without the use of two vessels by moving an electrode through a suspension at a given rate. Thus in Fig. 8, I have shown a vessel 80 of insulating material having a suspension of particles 81 therein. A plate 82 forming one electrode for the flow of current through the suspension is disposed on the bottom of the vessel 80 and is connected to a detecting circuit which in this case comprises for illustrative purposes a variable resistor 83, a current meter 84, and a battery 85. The lead 86 connects electrode 82 to the resistor 83. Immersed in the suspension 81, I have shown a sharp pointed electrode 87 eccentrically mounted on a member 88 secured to shaft 89 which in turn is connected to a motor 90. The motor 90 is connected to an electric power line by leads 91 in any desired manner. For purposes of carrying out an explanation of my apparatus, I have indicated a revolution counting instrument, such as for example a tachometer engaged against the motor shaft 92 at 93.

The shaft 89 has a disc 94 of insulating material upon which is mounted a slip ring 95 against which a collector brush 96 is adapted to wipe. The brush 96 is connected to the detector circuit by the lead 97. The electrode 87 is constructed as shown in Fig. 9 and comprises a central conducting core 98 having a minute exposed tip 99 immersed in the suspension, and an outer insulating covering 100. The core 98 is connected to the collector ring 95 by means of the lead 101 so that although the electrode 87 may be rotated in the solution it is constantly connected with the detecting circuit.

In order to use the apparatus just described, current is caused to flow through the suspension giving rise to a high density current field of extreme constriction in the vicinity of the tip 99. This is indicated by the broken lines 102. When a particle such as indicated at 103 comes within the influence of the field, the difference between conductivity of the fluid medium and the particle will cause a change in the current flow, thereby modulating the same. Thus, if the volume of influence of the tip 99 is known and the electrode 87 is rotated a given number of times in the vessel (or is rotated at a given rate for a given length of time) the total volume passed by the moving tip can be calculated from the dimensions of the rotational path, and the number of indications for any given unit volume can be determined.

Obviously, the apparatus described utilizes a current constriction which is not of uniform current density. The relative movement between fluid and electrode will carry some of the suspended particles well into the part of the constriction where the current density is the greatest and where the effect will be relatively large while other particles which are not carried into the region of greatest current constriction will not have as great an effect upon total current flow. Thus, identical particles may produce different effects. The sensitivity of the detecting device must therefore be carefully known and controlled for the purposes intended for use. Likewise, precautions must be taken to have homogeneous suspensions in which the relative conductivity between particles and fluid is uniform. Electrochemical effects upon electrodes should be eliminated as much as possible such as for example by using alternating current. In the apparatus previously described where the current is constricted by physically constricting the fluid, this last mentioned difficulty is greatly reduced.

In the use of my invention, it has been pointed out that the dilution of the sample should be sufficient to prevent masking. Masking occurs when movement of individual particles into or out of the influence of the current constriction is masked by the presence of other particles so that a true indication is not obtained of the single particle. It is possible under such circumstances to calibrate the instrument so that a given number of proper indications will represent a certain increased percentage of particles. This can be done even to a point where individual indications are the exception rather than the rule, but it is best to so dilute the suspension that the greater number of indications are caused by single particles. The sensitivity of the detecting device in a great measure must be considered in these adjustments.

A means for minimizing the effect of detector sensitivity on the number or size of particles detected is to provide means for sharply confining the electric field as would be accomplished if electrodes were placed on opposite inner sides of an insulated rectangular tube through which the particle bearing fluid is made to pass. Thus, in Fig. 10 there is shown a fragment of the wall of each of a pair of vessels 120 and 121 having a constriction extending therebetween in the form of a rectangular conduit 122. On opposite inner walls of the conduit 122 are provided electrodes 123 and 124 connected by the leads 125 and 126 to a detecting circuit. The purpose of such a construction is to provide a confined and relatively uniform field. Provided a reasonable sensitivity is maintained, with an apparatus of this kind large variations of detector sensitivity would have less effect upon the total number of particles detected than constrictions having unconfined fields. Fig. 5 is a variation of this construction, and many other variations should suggest themselves, such as for example the elimination of one electrode by the substitution of an "indifferent" electrode in one of the fluid volumes at either end of the tube. A great advantage of the construction shown is that the exact volume of fluid "scanned" conveniently and accurately can be determined.

Considering now the apparatus which has been shown and described in Fig. 1 and again in Fig. 6, the construction between the two vessels may take different forms for different purposes. It may be a tube of circular bore and of a length several times its diameter; it may be a perforation in an extremely thin membrane separating the two volumes; it may have a tapered inlet and an abrupt change of cross section at its outlet or vice versa; or both ends may be tapered or abrupt. The resulting change of current from any of these types of constrictions may be used for a multitude of purposes in detecting circuits for operating different kinds of triggering circuits, or giving certain pulses to instruments or detecting devices.

Considering now a membrane of insulating material having a perforation, in Fig. 11 I have shown such a constriction on a greatly exaggerated scale with a small graph of current $i$ versus time or position aligned therewith. As a particle passes from one side to the other of the membrane 130 the current will rise (presuming that the conductivity of the particle is greater than that of the fluid) so that the graph will appear as shown. Within the constriction 131 the current density is greatest so that the effect of the particle is greatest so that the current will produce a pulse 132 as the particle passes through the constriction 131. Variations in particle conductivity will affect the magnitude of the change of current, i. e., the amplitude of the pulse 132, while variations in particle size will affect the duration of the pulse 132 or its wave form in addition to the magnitude (providing the constriction dimensions are of the same order as those of the particle).

In Fig. 12, I have shown a relatively long tube 140 of insulating material for use in studying the conductivity of the particles as they move through said tube. The detecting instrument can be calibrated to account for masking caused by the presence of more than one particle in the tube. The current density in the center of the tube is constant and the particle is not subjected to the variable density of end effects. In this type of construction, as shown in Fig. 1, the electrodes are in the vessels connecting the constriction, which are indicated as 141 and 142 in said Fig. 12. The graph of current versus position shows that as the particle passes through the tube 140 a plateau 143 is formed having abrupt changes 144 and the 145 at its beginning and end. There is also shown a graph of current change $di$ which can be obtained by feeding the current into a differentiation circuit. At the beginning there will be a positive pulse 146 caused by the sudden increase; while the particle is in the tube 140 there will be no output of the differentiation circuit because the current flow is constant; and when the particle leaves the tube there will be a negative pulse caused by a sudden decrease in current. This presumes the particle has greater conductivity than the fluid medium of the suspension.

In Fig. 13, I have shown a constriction 150 the entrance to which is narrow and the bore of which tapers outwardly to produce a pulse 151 as the particle passes through the same.

It should be obvious that many types of pulses for many different purposes can be obtained by choice by constriction shape. It should also be obvious that many different kinds of particles can be counted and studied simultaneously and that counting and detecting devices can be used having their selectivities based upon current polarity, current amplitude, rate of current rise, duration of current and many other factors for counting and classifying particles.

In Fig. 7, I have illustrated a practical detecting and rate indicating device for use with an apparatus such as shown and described in connection with Fig. 6. The electrode 67 is connected by the lead 70 to ground 160. The battery 161 and resistance 162 are connected in series between the electrodes 68 and 69 and the relative conductivity of particles and fluid medium 61 is chosen such that passage of a particle through the aperture 65 provides a detectable pulse which is fed into the amplifier 163. The amplifier is of any known construction and hence is designated merely by a block in the diagram. A high negative pulse is produced in the output lead 164 and fed into the grid 165 of the pentode 166 which is biased by the battery 167 to a point where the pulse produced at 164 will cut the tube 166 off and interrupt flow of plate current therethrough. The plate is indicated at 168, screen grid at 169, screen grid resistor at 170, cathode at 171, and the second grid at 172. The plate resistor is indicated at 174. The output pulse from the plate 168 is fed through a blocking condenser 175 to the plate 176 of the diode 177 thereby charging the condenser 178. The output pulse of the amplifier 163 being negative and cutting off the tube 166 produces a high positive pulse which is impressed upon the plate 176. Obviously, the diode 179 is not affected because its cathode 180 is connected to receive the plate pulse. The negative pulse which is produced in the plate circuit of the tube 166 when the grid 165 returns to normal and causes the plate circuit to become conductive is shunted to ground through the diode 179 since its plate 181 is connected to ground 160. The cathode 182 of diode 177 is connected to condenser 178 which is small compared to the blocking condenser 175. Constant pulsing of the circuit by repeated increases in current flow between electrodes 67 and 68 thus builds up a charge on the condenser 178 which is leaked off through the resistor bleeder 183 and the current meter 184 to ground. The more frequent the pulses, the greater the charge on condenser 178 and the greater will be the reading of meter 184 which can therefore be calibrated to read directly rate of flow of particles through the constriction 65.

It is believed that the invention in all of its phases has been fully described and it is desired to point out that the scope of this invention is believed to encompass many variations. It is therefore desired that the only limitations to the same be as set forth in the claims hereto appended.

I claim:

1. Apparatus for studying the physical properties of particles suspended in a fluid medium of different conductivity than said particles which comprises, means for holding a quantity of said fluid medium having the particles suspended therein, means associated with said last mentioned means establishing a stable constricted electrical current path in said suspension, means producing a current along said path, means causing relative motion between the suspension and the constricted path whereby at least single particles passing within the influence of the path will modulate the current, and detecting means actuated by said modulated current.

2. Apparatus of the character described for studying the physical properties of particles suspended in a fluid medium having different electrical conductivity than said particles which comprises, a vessel holding a quantity of said fluid medium therein with said particles suspended in said medium, means establishing in said vessel a stable constricted electrical current path having its dimensions of the same order as the dimensions of said particles, means producing a current along said path, means for causing relative motion between the suspension and the constricted path whereby the particles coming within the electrical influence of said path will vary the current flow while so located, thereby modulating the current flow during such relative motion, and detecting means actuated by said current.

3. Apparatus of the character described in claim 2 in which the means establishing the constricted electrical path consist of two electrodes in the suspension, one electrode having an exposed area having dimensions of the same order as the dimensions of the particles in the suspension, and the detecting means being connected across the two electrodes.

4. Apparatus for studying the physical properties of particles suspended in a fluid medium having different electrical conductivity than the particles which comprises, a vessel of insulating material having a quantity of a suspension therein composed of the particles and the fluid medium, a pair of electrodes in the medium, one electrode having an exposed area having dimensions of the same order as the dimensions of the particles, electrical detecting means connected across said electrodes including means establishing a stable detectable current between said electrodes through the suspension, and means for moving said one electrode through the suspension in order to cause modulation of the current by the approach of particles to the said one electrode.

5. Apparatus for studying the physical properties of particles suspended in a fluid medium having different electrical conductivity than the particles which comprises, a vessel of insulating material having a quantity of a suspension therein composed of the particles and the fluid medium, a pair of electrodes in the medium, one electrode having an exposed area having dimensions of the same order as the dimensions of the particles, electrical detecting means connected across said electrodes including means establishing a stable detectable current between said electrodes through the suspension, and means for moving said one electrode through the suspension in order to cause modulation of the current by the approach of particles to the said one electrode, comprising rotating means mounting said electrode.

6. Apparatus as described in claim 1 in which the fluid holding means consists of a pair of vessels, the means establishing a constricted electrical path consists of an electrode in each vessel and a conduit of insulating material between the vessels having dimensions of the same order as the dimensions of said particles although larger than same and a source of electrical power connected across the electrodes.

7. Apparatus as described in claim 1 in which the fluid holding means consists of a pair of vessels, the means establishing a constricted electrical path consists of an electrode in each vessel and a conduit of insulating material between the vessels having dimensions of the same order as the dimensions of said particles although larger than same and a source of electrical power connected across the electrodes and the means causing relative motion between the suspension and the constricted path consists of a fluid pressure differential between the vessels.

8. Apparatus as described in claim 1 in which the fluid holding means and the means causing relative motion between the suspension and the constricted path comprise a pair of vessels of insulating material one within the other, a perforation in the inner vessel having dimensions of the order of the dimensions of the particles although larger than same, and a fluid pressure differential between the vessels.

9. Apparatus as described in claim 1 in which the fluid holding means and the means causing relative motion between the suspension and the constricted path comprise a pair of vessels of insulating material one within the other, a perforation in the inner vessel having dimensions of the order of the dimensions of the particles although larger than same, and a fluid pressure differential between the vessels, the means for causing the constricted current comprising said perforation and an electrode in each vessel having a source of electrical power connected thereto.

10. Apparatus of the character described for studying the physical properties of a suspension having particles in a fluid medium of different electrical conductivity than the particles, comprising a pair of vessels having a quantity of said suspension therein at different levels and being interconnected by a constricted conduit of insulating material having dimensions of the same order as the dimensions of the particles although larger than same, a pair of electrodes in the vessels having an external source of electrical power and being connected to current modulation detecting means, at least one of the electrodes being disposed in the conduit whereby to produce a high density current field in the path of flow of the suspension from one vessel to the other.

11. Apparatus as described in claim 1 in which the fluid holding means and the means causing relative motion between the suspension and the constricted path comprise a pair of vessels of insulating material one within the other, a perforation in the inner vessel having dimensions of the order of the dimensions of the particles although larger than same, and a fluid pressure differential between the vessels, said perforation being a substantial distance above the bottom of the inner vessel so that the flow of suspension from one vessel to the other will not include any settled portion of the said suspension.

12. Apparatus as described in claim 1 in which the fluid holding means consists of a pair of vessels, the means establishing a constricted electrical path consists of an electrode in each vessel and a conduit of insulating material between the vessels having dimensions of the same order as the dimensions of said particles although larger than same and a source of electrical power connected across the electrodes, said conduit having a contour considered in its axial direction varying the electrical current field along the length of the conduit in accordance with a predetermined law for producing a desired current pulse each time a particle passes through the conduit.

13. Apparatus as described in claim 1 in which the fluid holding means consists of a pair of vessels, the means establishing a constricted electrical path consists of an electrode in each vessel and a conduit of insulating material between the vessels having dimensions of the same order as the dimensions of said particles although larger than same and a source of electrical power connected across the electrodes, said conduit having a contour considered in its axial direction varying the electrical current field along the length of the conduit in accordance with a predetermined law for producing a desired current pulse each time a particle passes through the conduit, the amplitude of the produced pulse at any point at which the particle is within the conduit being inversely proportional to the cross sectional area of the conduit at that point.

14. Apparatus for studying the physical properties of particles suspended in a fluid medium of different conductivity than said particles which comprises, means for holding a quantity of said fluid medium having the particles suspended therein, means associated with the last mentioned means establishing a stable constricted electric current flow in a path in said suspension of pre-determined minute cross section dimension related to the particle dimensions such that particles moving within the influence of the path will detachably modulate the current singly, and means for causing relative movement between the suspension and the constricted path.

15. Apparatus as described in claim 1 in which the detecting means includes a counting device.

16. Apparatus as described in claim 2 in which the detecting means includes a counting device.

17. Apparatus as described in claim 6 in which the detecting means includes a counting device.

WALLACE H. COULTER.

References Cited in the file of this patent

UNITED STATES PATENTS

| Number | Name | Date |
|---|---|---|
| 1,070,556 | Strong | Aug. 19, 1913 |
| 1,168,227 | Schmidt | Jan. 11, 1916 |
| 1,995,492 | Andrus et al. | Mar. 26, 1935 |
| 2,122,363 | Christie | June 28, 1938 |
| 2,262,370 | Penney | Nov. 11, 1941 |
| 2,349,992 | Schrader | May 30, 1944 |
| 2,492,768 | Schaefer | Dec. 27, 1949 |